United States Patent
Lee

(10) Patent No.: US 9,406,106 B2
(45) Date of Patent: Aug. 2, 2016

(54) IMAGE PROCESSING CIRCUIT AND METHOD FOR REMOVING RINGING ARTIFACTS THEREOF

(71) Applicant: Novatek Microelectronics Corp., Hsinchu (TW)

(72) Inventor: Tung-Hsin Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 304 days.

(21) Appl. No.: 13/935,564

(22) Filed: Jul. 5, 2013

(65) Prior Publication Data

US 2014/0286592 A1    Sep. 25, 2014

(30) Foreign Application Priority Data

Mar. 22, 2013 (TW) .............................. 102110273 A

(51) Int. Cl.
    *G06T 5/00* (2006.01)
(52) U.S. Cl.
    CPC ....... *G06T 5/002* (2013.01); *G06T 2207/20012* (2013.01)
(58) Field of Classification Search
    CPC ...................................................... G06T 5/002
    See application file for complete search history.

(56) References Cited

U.S. PATENT DOCUMENTS

| | | | |
|---|---|---|---|
| 7,339,601 B2 | 3/2008 | Kim | |
| 7,440,635 B2 | 10/2008 | Tan et al. | |
| 8,184,204 B2 | 5/2012 | Chen | |
| 2002/0131512 A1* | 9/2002 | Boroczky et al. | 375/240.29 |
| 2003/0081854 A1* | 5/2003 | Deshpande | 382/261 |
| 2005/0147319 A1* | 7/2005 | Deshpande et al. | 382/268 |
| 2007/0280551 A1* | 12/2007 | Oztan et al. | 382/268 |
| 2008/0310750 A1 | 12/2008 | Osamoto et al. | |
| 2010/0033497 A1* | 2/2010 | Ueno et al. | 345/611 |
| 2010/0091195 A1 | 4/2010 | Lee et al. | |
| 2010/0118977 A1 | 5/2010 | Chiu et al. | |
| 2012/0219229 A1* | 8/2012 | Springer et al. | 382/199 |
| 2012/0236932 A1 | 9/2012 | Turlikov et al. | |

OTHER PUBLICATIONS

"Office Action of Taiwan Counterpart Application", issued on Jun. 17, 2015, p. 1-p. 4.

* cited by examiner

*Primary Examiner* — Devona Faulk
*Assistant Examiner* — Hai Tao Sun
(74) *Attorney, Agent, or Firm* — Jianq Chyun IP Office

(57) ABSTRACT

An image processing circuit and a ringing artifact removing method thereof are provided. The image processing circuit includes a deRing detection unit and a deRing filtering unit. The deRing detection unit receives a plurality of display data of an input frame and calculates a regulating reference value corresponding to each display data according to the display data and the display data at adjacent display positions. The deRing filtering unit is coupled to the deRing detection unit. The deRing filtering unit receives the display data and regulates the display data according the regulating reference values respectively corresponding to the display data to output a plurality of regulated display data.

13 Claims, 4 Drawing Sheets

IMAGE PROCESSING CIRCUIT AND METHOD FOR REMOVING RINGING ARTIFACTS THEREOF

CROSS-REFERENCE TO RELATED APPLICATION

This application claims the priority benefit of Taiwan application serial no. 102110273, filed on Mar. 22, 2013. The entirety of the above-mentioned patent application is hereby incorporated by reference herein and made a part of this specification.

BACKGROUND OF THE INVENTION

1. Field of the Invention

The present invention generally relates to a processing circuit and a noise cancelling method thereof, and more particularly, to an image processing circuit and a ringing artifact removing method thereof.

2. Description of Related Art

With advancement of computer technology, digital media have become one of the major instruments for demonstrating creativity and imagination in recent years. According to digital image processing (DIP) principles, analog images are "digitized" before the two-dimensional or the three-dimensional images are processed by computers. The image data are then digitally processed and transmitted to an image output device in form of digital images. After the image output device receives the digital image, the image data are up-sampled. If a low order filter is adopted in the image output device to up-sample the image data, data at high frequency in the digital image are blurred. By contrast, when a high order filter is utilized for up-sampling the image data, the data at high frequency in the digital image can be retained. However, with use of the high order filter for up-sampling the image data, ripples are likely to be formed due to ringing effects. As such, the quality of the ultimately output images is deteriorated.

Generally, ringing artifacts in the ultimately output images are removed by using a low-pass filter. However, the low-pass filter also removes some image details, which results in blurring artifacts. Thereby, a new technique for removing ringing artifacts from the ultimately output image is desired.

SUMMARY OF THE INVENTION

Accordingly, the present invention is directed to an image processing circuit and a ringing artifact removing method thereof, in which ringing artifacts in an image can be removed.

The present invention provides an image processing circuit for removing a ringing artifact in an image. The image processing circuit includes a deRing detection unit and a deRing filtering unit. The deRing detection unit receives a plurality of display data of an input frame and calculates a regulating reference value corresponding to each display data according to the display data and the display data at adjacent display positions. The deRing filtering unit is coupled to the deRing detection unit. The deRing filtering unit receives the display data and regulates the display data according to the regulating reference values respectively corresponding to the display data to output a plurality of regulated display data.

According to an embodiment of the present invention, the deRing detection unit includes an edge gain detection unit, a ringing artifact detection unit, and a multiplier. The edge gain detection unit receives the display data and calculates a regulating gain corresponding to each display data according to the display data and the display data at adjacent display positions. The ringing artifact detection unit receives the display data and calculates a ringing regulation value corresponding to each display data according to the display data and the display data at adjacent display positions. The multiplier is coupled to the edge detection unit and the ringing artifact detection unit. The multiplier provides the regulating reference value corresponding to each display data according to the regulating gain and the ringing regulation value corresponding to the display data.

According to an embodiment of the present invention, the edge gain detection unit includes an edge detection unit, an edge value determination unit, a gain mapping unit, and a gain determination unit. The edge detection unit receives the display data and calculates an edge value corresponding to each display data according to the display data and the display data at adjacent display positions. The edge value determination unit is coupled to the edge detection unit. The edge value determination unit determines an edge reference value and an edge maximum value corresponding to each display data according to the edge value corresponding to the display data and the edge values respectively corresponding to the display data at adjacent display positions. The gain mapping unit is coupled to the edge value determination unit. The gain mapping unit determines a gain reference value corresponding to each display data according to the edge reference value and the edge maximum value corresponding to the display data. The gain determination unit is coupled to the gain mapping unit. The gain determination unit determines the regulating gain corresponding to each display data according to the gain reference value corresponding to the display data and the gain reference values respectively corresponding to the display data at adjacent display positions.

According to an embodiment of the present invention, the ringing artifact detection unit includes a ring detection unit and a ring determination unit. The ring detection unit receives the display data and calculates a ring reference value corresponding to each display data according to the display data and the display data at adjacent display positions. The ring determination unit is coupled to the ring detection unit. The ring determination unit determines the ringing regulation value corresponding to each display data according to the ring reference value corresponding to the display data and the ring reference values respectively corresponding to the display data at adjacent display positions.

According to an embodiment of the present invention, the deRing filtering unit includes a low-pass filter and a ring removing unit. The low-pass filter receives the display data and outputs a display reference value corresponding to each display data. The ring removing unit is coupled to the low-pass filter and the deRing detection unit. The ring removing unit receives the display data and regulates the display data according to the regulating reference values and the display reference values respectively corresponding to the display data to output the regulated display data.

The present invention provides a ringing artifact removing method adapted to an image processing circuit. The ringing artifact removing method includes following steps. A plurality of display data of an input frame is received. A regulating reference value corresponding to each display data is calculated according to the display data and the display data at adjacent display positions. The display data are regulated according to the regulating reference values respectively corresponding to the display data to output a plurality of regulated display data.

According to an embodiment of the present invention, the step of calculating the regulating reference value corresponding to each display data according to the display data and the display data at adjacent display positions further includes following steps. A regulating gain corresponding to the display data is calculated according to the display data and the display data at adjacent display positions. A ringing regulation value corresponding to the display data is calculated according to the display data and the display data at adjacent display positions. The regulating gain is multiplied by the ringing regulation value to provide the regulating reference value.

According to an embodiment of the present invention, the step of calculating the regulating gain corresponding to each display data according to the display data and the display data at adjacent display positions further includes following steps. An edge value corresponding to the display data is calculated according to the display data and the display data at adjacent display positions. An edge reference value and an edge maximum value corresponding to the display data are determined according to the edge value corresponding to the display data and the edge values respectively corresponding to the display data at adjacent display positions. A gain reference value corresponding to the display data is determined according to the edge reference value and the edge maximum value corresponding to the display data. The regulating gain corresponding to the display data is determined according to the gain reference value corresponding to the display data and the gain reference values respectively corresponding to the display data at adjacent display positions.

According to an embodiment of the present invention, the edge value corresponding to each display data is calculated by using following formula, $$e(x) = \max\left(\sum_{r=x-k+1}^{x} |p_r - p_{r-1}|, \sum_{r=x+1}^{x+k} |p_r - p_{r-1}|\right).$$

In foregoing formula, x is an factor corresponding to the display data, $e(x)$ is the edge value corresponding to the display data, $p_x$ is a grayscale value corresponding to the display data, $p_{x-k+1}$ to $p_{x+k-1}$ are respectively grayscale values corresponding to the adjacent display data, and k is a scaling rate of the input frame relative to an original frame.

According to an embodiment of the present invention, the edge maximum value corresponding to each display data is determined by using following formula, $$em(x) = \max\left\{e(x+r)\left|-\frac{k}{2} < r \le \frac{k}{2}\right.\right\}.$$

In foregoing formula, $em(x)$ is the edge maximum value corresponding to the display data, and the edge reference value corresponding to each display data is determined by using following formulae, $E_1(x) = \max\{e(x-r) \cdot d(r) | 0 \le r < 8k\}$ $E_2(x) = \max\{e(x+r) \cdot d(r) | 0 \le r < 8k\}$ $E(x) = |E_1(x) - E_2(x)| + e(x).$ In foregoing formulae, $E(x)$ is the edge reference value corresponding to the display data, and $d(r)$ is a distance function. According to an embodiment of the present invention, the distance function $d(r) = k/r$.

According to an embodiment of the present invention, when the quotient of $em(x)$ divided by $E(x)$ is smaller than or equal to a first threshold th1, the gain reference value $g(x)$ corresponding to each display data is set to be 1. When the quotient of $em(x)$ divided by $E(x)$ is greater than the first threshold th1 and smaller than a second threshold th2, the gain reference value $g(x)$ corresponding to each display data is set to be smaller than 1 and greater than 0, and the gain reference value $g(x)$ presents a linear characteristic. When the quotient of $em(x)$ divided by $E(x)$ is greater than or equal to the second threshold th2, the gain reference value $g(x)$ corresponding to each display data is set to be 0.

According to an embodiment of the present invention, the regulating gain corresponding to each display data is determined by using following formula, $$G(x) = \max\left\{g(x)\left|-\frac{k}{2} \le x \le \frac{k}{2}\right.\right\}.$$

In foregoing formula, $G(x)$ is the regulating gain corresponding to the display data.

According to an embodiment of the present invention, the step of calculating the ringing regulation value corresponding to each display data according to the display data and the display data at adjacent display positions further includes following steps. A ring reference value corresponding to the display data is calculated according to the display data and the display data at adjacent display positions. The ringing regulation value corresponding to the display data is determined according to the ring reference value corresponding to the display data and the ring reference values respectively corresponding to the display data at adjacent display positions.

According to an embodiment of the present invention, the ring reference value corresponding to each display data is calculated by using following formulae, $$r_1(x) = \frac{-p_{x-2k} + 2 \cdot p_{x-k} - p_x}{2}$$

$$r_2(x) = \frac{-p_{x-k} + 2 \cdot p_x - p_{x+k}}{2}$$

$$r_3(x) = \frac{-p_x + 2 \cdot p_{x+k} - p_{x+2k}}{2}$$

$$r_N(x) = \frac{r_1(x) + r_3(x)}{2}$$

$$r(x) = \begin{cases} 0 & \text{if } (r_2(x) \cdot r_N(x) \ge 0) \\ \min(|r_2(x)|, |r_N(x)|) & \text{otherwise} \end{cases}.$$

In foregoing formulae, x is an factor corresponding to the display data, $r(x)$ is the ring reference value corresponding to the display data, $p_x$ is a grayscale value corresponding to the display data, $p_{x-2k}$ to $p_{x+2k}$ are respectively grayscale values corresponding to the adjacent display data, and k is a scaling rate of the input frame relative to an original frame.

According to an embodiment of the present invention, the ringing regulation value corresponding to each display data is determined by using following formula, $$R(x) = \max\left\{r(x)\left|-\frac{k}{2} \le x \le \frac{k}{2}\right.\right\}.$$

In foregoing formula, R(x) is the ringing regulation value corresponding to the display data.

According to an embodiment of the present invention, the step of regulating the display data according to the regulating reference values respectively corresponding to the display data further includes following steps. The display data is low-pass filtered to output a display reference value corresponding to each display data. The display data is regulated according to the regulating reference values and the display reference values respectively corresponding to the display data to output the regulated display data.

According to an embodiment of the present invention, the display reference value corresponding to each display data is determined by using following formula, $$f(x) = \frac{p_{x-k} + 2 \cdot p_x + p_{x+k}}{4}.$$

In foregoing formula, x is an factor corresponding to the display data, f(x) is the display reference value corresponding to the display data, $p_x$ is a grayscale value corresponding to the display data, $p_{x-k}$ to $p_{x+k}$ are respectively grayscale values corresponding to the adjacent display data, and k is a scaling rate of the input frame relative to an original frame.

According to an embodiment of the present invention, the grayscale values corresponding to the regulated display data are calculated by using following formula, $$p'_x = p_x + (f(x) - p_x)|_{-S(x)}^{S(x)}.$$

In foregoing formula, $p'_x$ is the grayscale value corresponding to each regulated display data, and S(x) is the regulating reference value corresponding to each display data.

As described above, in an image processing circuit and a ringing artifact removing method thereof provided by embodiments of the present invention, ringing artifacts in an input frame can be detected, and the corresponding regulating reference values are provided. Display data of the input frame is regulated according to the regulating reference values so as to provide the regulated display data. Thereby, the ringing artifacts in the input frame can be removed so as to output an output frame, and the quality of the output frame is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
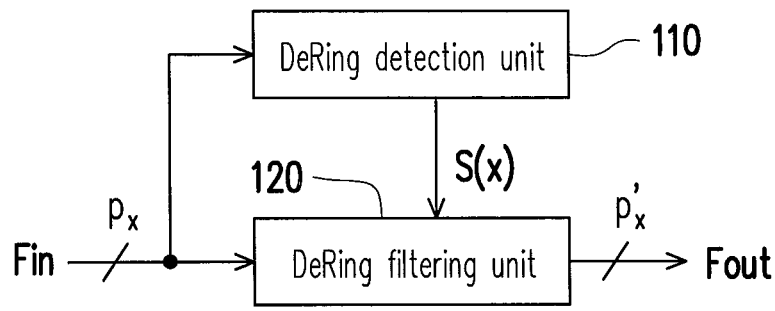
FIG. 1 is a schematic diagram of an image processing circuit according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an image processing circuit according to an embodiment of the present invention. Referring to FIG. 1, in the present embodiment, the image processing circuit 100 includes a deRing detection unit 110 and a deRing filtering unit 120. The deRing detection unit 110 receives a plurality of grayscale values $p_x$ respectively represented by a plurality of display data of an input frame Fin and calculates a regulating reference value S(x) corresponding to each display data according to the grayscale value $p_x$ represented by the display data and the grayscale values $p_x$ respectively represented by the display data at adjacent display positions. Herein x is the factor corresponding to each display data.

Besides, aforementioned adjacent display positions may be display positions vertically adjacent, horizontally adjacent, or both vertically and horizontally adjacent to the current display position. However, the definition of an adjacent display position is not limited in the present invention and can be determined by those having ordinary knowledge in the art. In other words, the deRing detection unit 110 calculates the regulating reference value S(x) corresponding to each display data according to the grayscale value $p_x$ represented by the display data and the grayscale values $p_x$ respectively represented by the display data at horizontally adjacent display positions. Or, the deRing detection unit 110 calculates the regulating reference value S(x) corresponding to each display data according to the grayscale value $p_x$ represented by the display data and the grayscale values $p_x$ respectively represented by the display data at vertically adjacent display positions. Or, the deRing detection unit 110 calculates the regulating reference value S(x) corresponding to each display data according to the grayscale value $p_x$ represented by the display data and the grayscale values $p_x$ respectively represented by the display data at both vertically and horizontally adjacent display positions.

The deRing filtering unit 120 is coupled to the deRing detection unit 110. The deRing filtering unit 120 receives the grayscale value $p_x$ respectively represented by the display data of the input frame Fin and regulates the grayscale values $p_x$ respectively represented by the display data according to the regulating reference values S(x) respectively corresponding to the display data to output grayscale values $p'_x$ respectively represented by a plurality of regulated display data and provide an output frame Fout. When the grayscale values $p_x$ respectively represented by the display data need to be regulated (i.e., the grayscale values $p_x$ are affected by a ringing artefact), the regulating reference values S(x) are non-zero real numbers, such that the grayscale values $p_x$ respectively represented by the display data are regulated into the grayscale values $p'_x$ according to the regulating reference values S(x). Contrarily, when the grayscale values $p_x$ respectively represented by the display data need not to be regulated (i.e., the grayscale values $p_x$ are not affected by the ringing artefact), the regulating reference value S(x) is zero, such that the grayscale values $p_x$ respectively represented by the display data are directly output as the grayscale value $p'_x$ (i.e., the grayscale values $p'_x$ are equal to the grayscale values $p_x$).

Based on foregoing description, the deRing detection unit 110 detects whether the grayscale value $p_x$ corresponding to each display data needs to be regulated and provides the corresponding regulating reference value S(x). The deRing filtering unit 120 chooses to regulate or not regulate the grayscale values $p_x$ respectively represented by the display data according to the regulating reference values S(x) respectively corresponding to the display data. Thereby, the image processing circuit 100 can remove any ringing artifact in the input frame Fin and outputs the output frame Fout with improved image quality.

Figure 2:
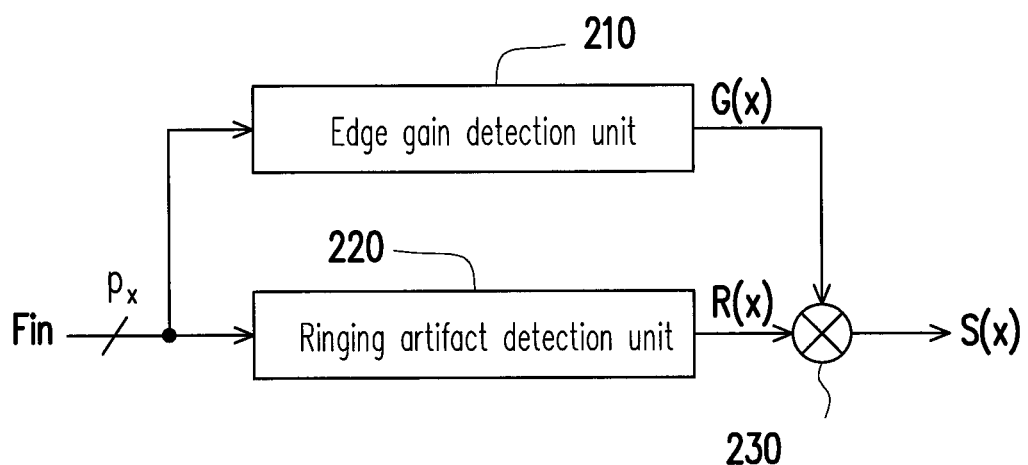
FIG. 2 is a schematic diagram of a deRing detection unit in FIG. 1 according to an embodiment of the present invention.
Figure 3A:
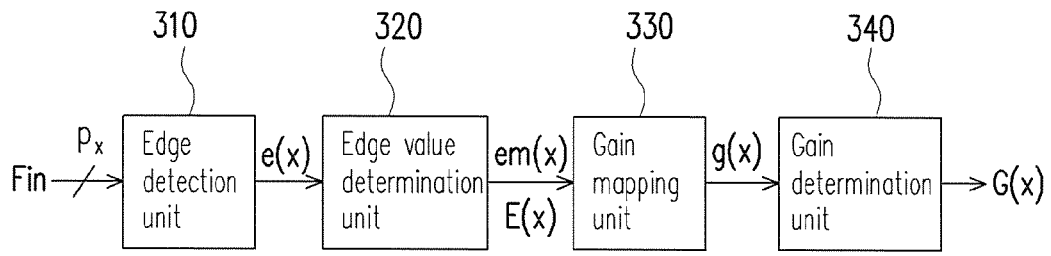
FIG. 3A is a schematic diagram of an edge gain detection unit in FIG. 2 according to an embodiment of the present invention.

FIG. 2 is a schematic diagram of the deRing detection unit in FIG. 1 according to an embodiment of the present invention. Referring to FIG. 1 and FIG. 2, the deRing detection unit 200 in the present embodiment is an implementation example of the deRing detection unit 110, and the same or similar elements are marked with the same or similar reference numerals throughout. The deRing detection unit 200 includes an edge gain detection unit 210, a ringing artifact detection unit 220, and a multiplier 230. The edge gain detection unit 210 receives the grayscale values $p_x$ respectively represented by the display data of the input frame Fin and calculates a regulating gain G(x) corresponding to each display data according to the grayscale value $p_x$ represented by the display data and the grayscale values $p_x$ respectively represented by the display data at adjacent display positions. The ringing artifact detection unit 220 receives the grayscale values $p_x$ respectively represented by the display data of the input frame Fin and calculates a ringing regulation value R(x) corresponding to each display data according to the grayscale value $p_x$ represented by the display data and the grayscale values $p_x$ respectively represented by the display data at adjacent display positions. The multiplier 230 is coupled to the edge gain detection unit 210 and the ringing artifact detection unit 220. The multiplier 230 multiplies the regulating gain G(x) corresponding to each display data by the ringing regulation value R(x) corresponding to the display data to provide the regulating reference value S(x) corresponding to the display data FIG. 3A is a schematic diagram of the edge gain detection unit in FIG. 2 according to an embodiment of the present invention. Referring to FIG. 2 and FIG. 3A, the edge gain detection unit 300 in the present embodiment is an implementation example of the edge gain detection unit 210, and the same or similar elements are marked with the same or similar reference numerals throughout. The edge gain detection unit 300 includes an edge detection unit 310, an edge value determination unit 320, a gain mapping unit 330, and a gain determination unit 340.

The edge detection unit 310 receives the grayscale values $p_x$ respectively represented by the display data of the input frame Fin and calculates an edge value e(x) corresponding to each display data according to the grayscale value $p_x$ represented by the display data and the grayscale values $p_x$ respectively represented by the display data at adjacent display positions. In an embodiment of the present invention, the edge detection unit 310 calculates the edge value e(x) corresponding to each display data by using following formula, $$e(x) = \max\left(\sum_{r=x-k+1}^{x} |p_r - p_{r-1}|, \sum_{r=x+1}^{x+k} |p_r - p_{r-1}|\right)$$

In foregoing formula, $p_x$ is the grayscale value represented by the current display data, $p_{x+k+1}$ to $p_{x-1}$ and $p_{x+1}$ to $p_{x+k-1}$ are the grayscale values represented by the adjacent display data, and k is a scaling rate of the input frame Fin relative to an original frame (not shown). In other words, when the input frame Fin is identical to the original frame, k=1, and when the input frame Fin is different from the original frame, k is the number of times that the input frame Fin is scaled relative to the original frame. In foregoing formula, a sum of the differences between every two of the grayscale values $p_{x-k+1}$ to $p_x$ and a sum of the differences between every two of the grayscale values $p_x$ to $p_{x+k-1}$ are calculated, and the larger one of the two sums is served as the edge value e(x) corresponding to the current display data.

The edge value determination unit 320 is coupled to the edge detection unit 310. The edge value determination unit 320 determines an edge reference value E(x) and an edge maximum value em(x) corresponding to each display data according to the edge value e(x) corresponding to the display data and the edge values e(x) respectively corresponding to the display data at adjacent display positions. In an embodiment of the present invention, the edge value determination unit 320 determines the edge maximum value em(x) corresponding to each display data by using following formula, $$em(x) = \max\left\{e(x+r)\left|-\frac{k}{2} < r \le \frac{k}{2}\right.\right\}.$$

In foregoing formula, the maximum value among the edge values e(x+k/2) to e(x−k/2) is served as the edge maximum value em(x) corresponding to the display data. Besides, the edge value determination unit 320 determines the edge reference value E(x) corresponding to each display data by using following formula, $E_1(x)=\max\{e(x-r)\cdot d(r)|0 \le r < 8k\}$ $E_2(x)=\max\{e(x+r)\cdot d(r)|0 \le r < 8k\}$ $E(x)=|E_1(x)-E_2(x)|+e(x).$ In foregoing formula, d(r) is a distance function, $E_1(x)$ is to obtain the maximum value among e(x−8k)×d(8k) to e(x)×d(0), $E_2(x)$ is to obtain the maximum value among e(x+8k)×d(8k) to e(x)×d(0), and the edge reference value E(x) is the sum of the difference between $E_1(x)$ and $E_2(x)$ and the edge value e(x). If $E_1(x)$ is the maximum value found to the left of the current display data, $E_2(x)$ is then the maximum value found to the right of the current display data. If $E_1(x)$ is the maximum value found below the current display data, $E_2(x)$ is then the maximum value found above the current display data. In an embodiment of the present invention, the distance function d(r) is k/r. However, the present invention is not limited thereto.

Figure 3B:
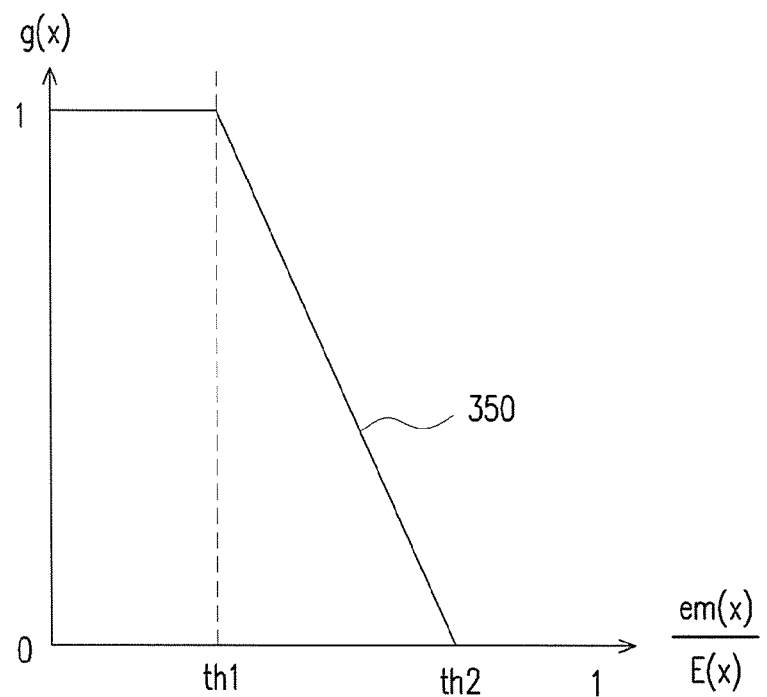
FIG. 3B is a mapping graph of an edge reference value, an edge maximum value, and a gain reference value in FIG. 3A.

The gain mapping unit 330 is coupled to the edge value determination unit 320. The gain mapping unit 330 determines a gain reference value g(x) corresponding to each display data according to the edge reference value E(x) and the edge maximum value em(x) corresponding to the display data. FIG. 3B is a mapping graph of the edge reference value, the edge maximum value, and the gain reference value in FIG. 3A. Referring to FIG. 3A and FIG. 3B, in the present embodiment, the curve 350 represents the relationship between the gain reference value g(x) and the quotient of the edge maximum value em(x) divided by the edge reference value E(x).

In the present embodiment, when the quotient of the edge maximum value em(x) divided by the edge reference value E(x) is smaller than or equal to a first threshold th1, the gain mapping unit 330 sets the gain reference value g(x) corresponding to each display data to 1. When the quotient of the edge maximum value em(x) divided by the edge reference value E(x) is greater than the first threshold th1 and smaller than a second threshold th2, the gain mapping unit 330 sets the gain reference value g(x) corresponding to each display data to be smaller than 1 and greater than 0, and the gain reference value g(x) and the quotient of the edge maximum value em(x) divided by the edge reference value E(x) present a linear relationship. When the quotient of the edge maximum value em(x) divided by the edge reference value E(x) is greater than or equal to the second threshold th2, the gain mapping unit 330 sets the gain reference value g(x) corresponding to each display data to 0. Herein the first threshold th1 is greater than 0 and smaller than the second threshold th2, the second threshold th2 is smaller than 1, and the spaces between 0, the first threshold th1, the second threshold th2, and 1 are not limited in the present invention and can be determined by those having ordinary knowledge in the art.

The gain determination unit 340 is coupled to the gain mapping unit 330. The gain determination unit 340 determines the regulating gain G(x) corresponding to each display data according to the gain reference value g(x) corresponding to the display data and the gain reference values g(x) respectively corresponding to the display data at adjacent display positions. In an embodiment of the present invention, the gain determination unit 340 determines the regulating gain G(x) corresponding to each display data by using following formula, $$G(x) = \max\left\{ g(x) \middle| -\frac{k}{2} \leq x \leq \frac{k}{2} \right\}.$$

In foregoing formula, the maximum value among the gain reference values g(k/2) to g(−k/2) is served as the regulating gain G(x) corresponding to the display data.

Figure 4:
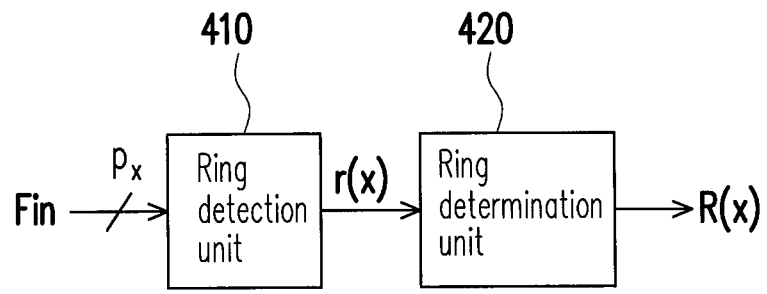
FIG. 4 is a schematic diagram of a ringing artifact detection unit in FIG. 2 according to an embodiment of the present invention.

FIG. 4 is a schematic diagram of the ringing artifact detection unit in FIG. 2 according to an embodiment of the present invention. Referring to FIG. 2 and FIG. 4, the ringing artifact detection unit 400 in the present embodiment is an implementation example of the ringing artifact detection unit 220, and the same or similar elements are marked with the same or similar reference numerals throughout. The ringing artifact detection unit 400 includes a ring detection unit 410 and a ring determination unit 420.

The ring detection unit 410 receives the grayscale values $p_x$ respectively represented by the display data of the input frame Fin and calculates a ring reference value r(x) corresponding to each display data according to the grayscale value $p_x$ represented by the display data and the grayscale values $p_x$ respectively represented by the display data at adjacent display positions. In an embodiment of the present invention, the ring detection unit 410 calculates the ring reference value r(x) corresponding to each display data by using following formulae, $$r_1(x) = \frac{-p_{x-2k} + 2 \cdot p_{x-k} - p_x}{2}$$

$$r_2(x) = \frac{-p_{x-k} + 2 \cdot p_x - p_{x+k}}{2}$$

$$r_3(x) = \frac{-p_x + 2 \cdot p_{x+k} - p_{x+2k}}{2}$$

$$r_N(x) = \frac{r_1(x) + r_3(x)}{2}$$

$$r(x) = \begin{cases} 0 & \text{if } (r_2(x) \cdot r_N(x) \geq 0) \\ \min(|r_2(x)|, |r_N(x)|) & \text{othrewise} \end{cases}.$$

In foregoing formulae, the grayscale values $p_{x-2k}$ to $p_{x+2k}$ are the grayscale values respectively corresponding to the current display data and the adjacent display data. Based on foregoing formulae, the ring detection unit 410 obtains a plurality of ring values $r_1(x)$ to $r_3(x)$ corresponding to the current display data by using a high-pass filter (HPF) and determines the ring reference value r(x) to be 0 or the smaller one of the ring value $r_2(x)$ and the average value of the ring values $r_1(x)$ and $r_3(x)$ according to the ring values $r_1(x)$ to $r_3(x)$. If the ring value $r_1(x)$ is a ring value corresponding to left side of the current display data, the ring value $r_3(x)$ is then a ring value corresponding to the right side of the current display data, and the ring value $r_2(x)$ is then a ring value corresponding to the center of the current display data.

The ring determination unit 420 is coupled to the ring detection unit 410. The ring determination unit 420 determines the ringing regulation value R(x) corresponding to each display data according to the ring reference value r(x) corresponding to the display data and the ring reference values r(x) respectively corresponding to the display data at adjacent display positions. In an embodiment of the present invention, the ring determination unit 420 determines the ringing regulation value R(x) corresponding to each display data by using following formula, $$R(x) = \max\left\{ r(x) \middle| -\frac{k}{2} \leq x \leq \frac{k}{2} \right\}$$

In foregoing formula, the maximum value among the ring reference values r(k/2) to r(−k/2) is served as the ringing regulation value R(x) corresponding to the display data.

Figure 5:
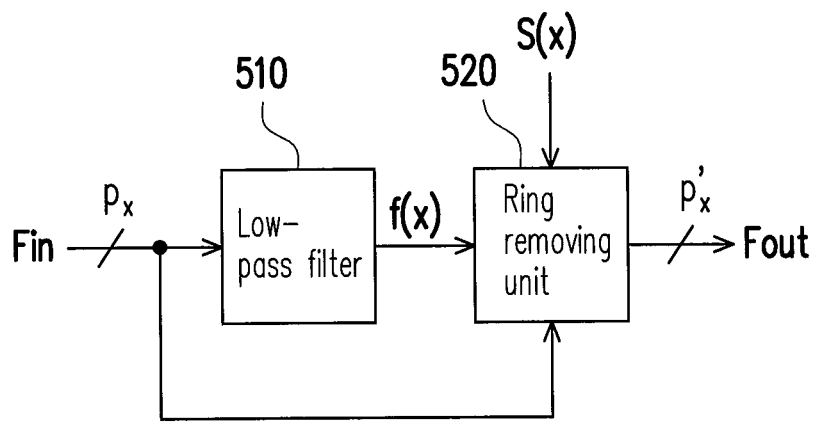
FIG. 5 is a schematic diagram of a deRing filtering unit in FIG. 1 according to an embodiment of the present invention.

FIG. 5 is a schematic diagram of the deRing filtering unit in FIG. 1 according to an embodiment of the present invention. Referring to FIG. 1 and FIG. 5, the deRing filtering unit 500 in the present embodiment is an implementation example of the deRing filtering unit 120, and the same or similar elements are marked with the same or similar reference numerals throughout. The deRing filtering unit 500 includes a low-pass filter 510 and a ring removing unit 520.

The low-pass filter 510 receives the grayscale values $p_x$ respectively represented by the display data of the input frame Fin and respectively low-pass filters the grayscale values $p_x$ to output a plurality of display reference values f(x) respectively corresponding to the display data. In an embodiment of the present invention, the low-pass filter 510 determines the display reference value f(x) corresponding to each display data by using following formula, $$f(x) = \frac{p_{x-k} + 2 \cdot p_x + p_{x+k}}{4}.$$

In foregoing formula, $p_{x-k}$ to $p_{x+k}$ are the grayscale values respectively corresponding to the current display data and the adjacent display data.

The ring removing unit 520 is coupled to the low-pass filter 510 and a deRing detection unit (for example, the deRing detection unit 110). The ring removing unit 520 receives the grayscale values $p_x$ respectively represented by the display data of the input frame Fin and regulates the grayscale value $p_x$ represented by each display data according to the regulating reference value S(x) and the display reference value f(x) corresponding to the display data to output the grayscale value $p'_x$ represented by the regulated display data. In an embodiment of the present invention, the ring removing unit 520 calculates the grayscale values $p'_x$ respectively represented by the regulated display data by using following formula, $$p'_x = p_x + (f(x) - p_x)|_{-S(x)}^{S(x)}$$

In foregoing formula, the result of $(f(x)-p_x)$ is multiplied by S(x) or $-S(x)$ to determine the regulation range of the grayscale value $p'_x$. The selection of S(x) and $-S(x)$ is not limited in the present invention and can be done according to the requirement of the regulation or by those having ordinary knowledge in the art.

In an embodiment of the present invention, foregoing factors x, r, and k are integers such that the calculations can be performed conveniently. However, the present invention is not limited thereto, and in other embodiments, the factors x, r, and k may also be real numbers.

Figure 6:
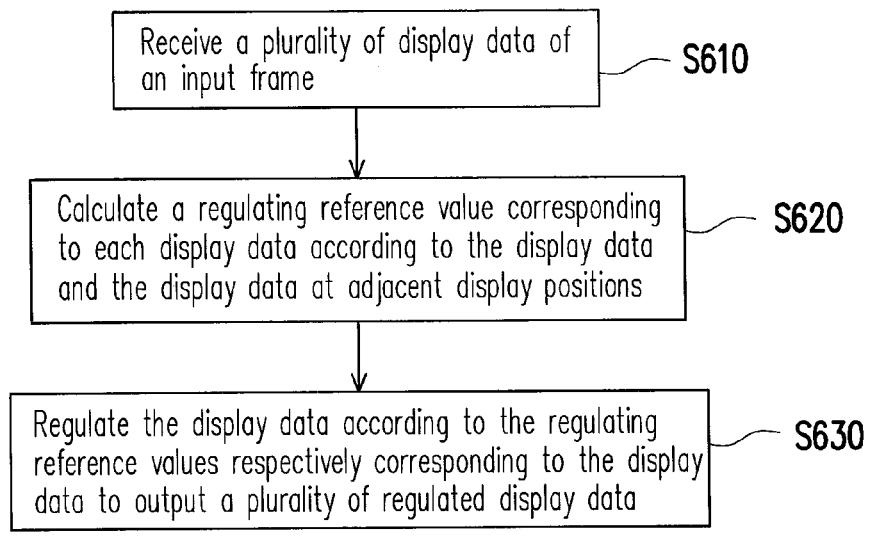
FIG. 6 is a flowchart of a ringing artifact removing method according to an embodiment of the present invention.

FIG. 6 is a flowchart of a ringing artifact removing method according to an embodiment of the present invention. Referring to FIG. 6, the ringing artifact removing method in the present embodiment includes following steps. A plurality of display data of an input frame is received (step S610), and a regulating reference value corresponding to each display data is calculated according to the display data and the display data at adjacent display positions (step S620). Next, the display data is regulated according to the regulating reference values respectively corresponding to the display data to output a plurality of regulated display data (step S630).

Figure 7:
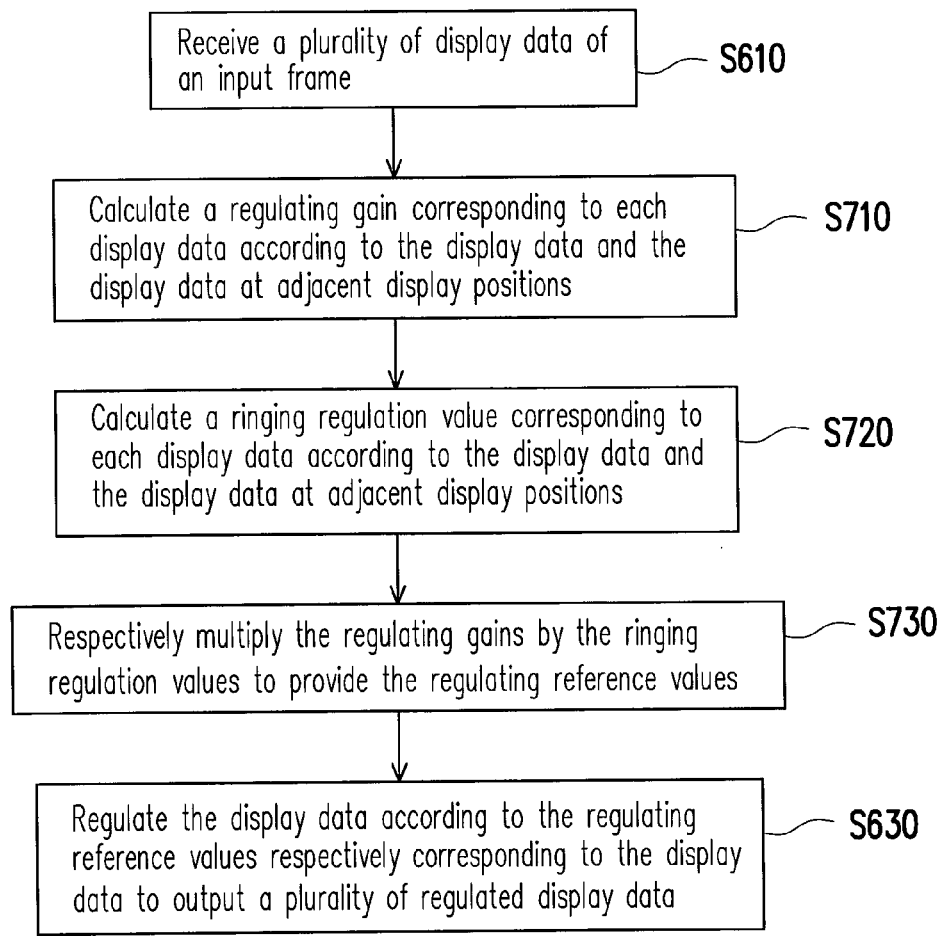
FIG. 7 is a flowchart of a ringing artifact removing method according to another embodiment of the present invention.

FIG. 7 is a flowchart of a ringing artifact removing method according to another embodiment of the present invention. Referring to FIG. 6 and FIG. 7, the difference between the embodiment described above and the present embodiment falls on steps S710, S720, and S730 in the present embodiment. In step S710, a regulating gain corresponding to each display data is calculated according to the display data and the display data at adjacent display positions. In step S720, a ringing regulation value corresponding to each display data is calculated according to the display data and the display data at adjacent display positions. In step S730, the regulating gains are respectively multiplied by the ringing regulation values to provide the regulating reference values.

The sequence of the steps S610, S620, S630, S710, S720, and S730 mentioned above is only an example but not intended to limit the scope of the present invention. Besides, the details of the steps S610, S620, S630, S710, S720, and S730 can be referred to the embodiments illustrated in FIG. 1, FIG. 2, FIG. 3A, FIG. 3B, FIG. 4, and FIG. 5 and will not be described herein.

To be specific, in an embodiment of the present invention, step S710 further includes following steps. An edge value corresponding to each display data is calculated according to the display data and the display data at adjacent display positions. An edge reference value and an edge maximum value corresponding to each display data are determined according to the edge value corresponding to the display data and the edge values respectively corresponding to the display data at adjacent display positions. A gain reference value corresponding to each display data is determined according to the edge reference value and the edge maximum value corresponding to the display data. The regulating gain corresponding to each display data is determined according to the gain reference value corresponding to the display data and the gain reference values respectively corresponding to the display data at adjacent display positions.

In an embodiment of the present invention, step S720 further includes following steps. A ring reference value corresponding to each display data is calculated according to the display data and the display data at adjacent display positions. The ringing regulation value corresponding to each display data is determined according to the ring reference value corresponding to the display data and the ring reference values respectively corresponding to the display data at adjacent display positions.

In an embodiment of the present invention, step S630 further includes following steps. The display data is low-pass filtered to output a display reference value corresponding to each display data. The display data is regulated according to the regulating reference values and the display reference values respectively corresponding to the display data to output the regulated display data.

As described above, in an image processing circuit and a ringing artifact removing method thereof provided by embodiments of the present invention, ringing artifacts in an input frame can be detected, and the corresponding regulating reference values are provided. Display data of the input frame is regulated according to the regulating reference values so as to provide the regulated display data. Thereby, the ringing artifacts in the input frame can be removed so as to output an output frame, and the quality of the output frame is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A ringing artifact removing method, adapted to program a processor of an image processing circuit, the ringing artifact removing method comprising:

receiving grayscale values corresponding to a plurality of display data of an input frame;

calculating a regulating reference value corresponding to each of the display data according to the display data and the display data at adjacent display positions, comprising:

calculating an edge value and a ring reference value corresponding to each of the display data according to the grayscale value corresponding to the display data and the grayscale values corresponding to the display data at adjacent display positions, wherein the input frame is a scaled frame of an original frame and a scaling rate of the input frame relative to the original frame is taken into account when calculating the edge value and calculating the ring reference value; and calculating the regulating reference value corresponding to each of the display data according to the edge value and the ring reference value; and regulating the grayscale values corresponding to the display data according to the regulating reference values respectively corresponding to the display data to output grayscale values corresponding to a plurality of regulated display data, wherein the edge value corresponding to each of the display data is calculated by using following formula, $$e(x) = \max\left(\sum_{r=x-k+1}^{x} |p_r - p_{r-1}|, \sum_{r=x+1}^{x+k} |p_r - p_{r-1}|\right)$$

wherein x is a factor corresponding to the display data, e(x) is the edge value corresponding to the display data, $p_r$ is a grayscale value corresponding to the display data $p_{r-1}$ is a grayscale values corresponding to an adjacent display data, and k is the scaling rate of the input flame relative to the original frame.

2. The ringing artifact removing method according to claim 1, wherein the step of calculating the regulating reference value corresponding to each of the display data according to the edge value and the ring reference value comprises:
calculating a regulating gain corresponding to the display data according to the edge value;
calculating a ringing regulation value corresponding to the display data according to the ring reference value; and
multiplying the regulating gain by the ringing regulation value to provide the regulating reference value.

3. The ringing artifact removing method according to claim 2, wherein the step of calculating the regulating gain corresponding to each of the display data according to the edge value comprises:
determining an edge reference value and an edge maximum value corresponding to the display data according to the edge value corresponding to the display data and the edge values respectively corresponding to the display data at adjacent display positions;
determining a gain reference value corresponding to the display data according to the edge reference value and the edge maximum value corresponding to the display data; and
determining the regulating gain corresponding to the display data according to the gain reference value corresponding to the display data and the gain reference values respectively corresponding to the display data at adjacent display positions.

4. The ringing artifact removing method according to claim 1, wherein the edge maximum value corresponding to each of the display data is determined by using following formula $$em(x) = \max\left\{e(x+r) \middle| -\frac{k}{2} < r \le \frac{k}{2}\right\}$$

wherein em(x) is the edge maximum value corresponding to the display data,
and the edge reference value corresponding to each of the display data is determined by using following formula, $E_1(x) = \max\{e(x-r) \cdot d(r) | 0 \le r < 8k\}$ $E_2(x) = \max\{e(x+r) \cdot d(r) | 0 \le r < 8k\}$ $E(x) = |E_1(x) - E_2(x)| + e(x).$ wherein E(x) is the edge reference value corresponding to the display data, and d(r) is a distance function.

5. The ringing artifact removing method according to claim 4, wherein the distance function d(r)=k/r.

6. The ringing artifact removing method according to claim 4, wherein when a quotient of em(x) divided by E(x) is smaller than or equal to a first threshold th1, the gain reference value g(x) corresponding to each of the display data is set to 1,
when the quotient of em(x) divided by E(x) is greater than the first threshold th1 and smaller than a second threshold th2, the gain reference value g(x) corresponding to each of the display data is smaller than 1 and greater than 0, and the gain reference value g(x) presents a linear characteristic,
when the quotient of em(x) divided by E(x) is greater than or equal to the second threshold th2, the gain reference value g(x) corresponding to each of the display data is set to 0.

7. The ringing artifact removing method according to claim 6, wherein the regulating gain corresponding to each of the display data is determined by using following formula, $$G(x) = \max\left\{g(x) \middle| -\frac{k}{2} \le x \le \frac{k}{2}\right\}$$

wherein G(x) is the regulating gain corresponding to the display data.

8. The ringing artifact removing method according to claim 2, wherein the step of calculating the ringing regulation value corresponding to each of the display data according to the ring reference value comprises:
determining the ringing regulation value corresponding to the display data according to the ring reference value corresponding to the display data and the ring reference values respectively corresponding to the display data at adjacent display positions.

9. The ringing artifact removing method according to claim 8, wherein the ring reference value corresponding to each of the display data is calculated by using following formula, $$r_1(x) = \frac{-p_{x-2k} + 2 \cdot p_{x-k} - p_x}{2}$$

$$r_2(x) = \frac{-p_{x-k} + 2 \cdot p_x - p_{x+k}}{2}$$

$$r_3(x) = \frac{-p_x + 2 \cdot p_{x+k} - p_{x+2k}}{2}$$

$$r_N(x) = \frac{r_1(x) + r_3(x)}{2}$$

$$r(x) = \begin{cases} 0 & \text{if } (r_2(x) \cdot r_N(x) \ge 0) \\ \min(|r_2(x)|, |r_N(x)|) & \text{othrewise} \end{cases}$$

wherein x is a factor corresponding to the display data, r(x) is the ring reference value corresponding to the display data, $p_x$ is a grayscale value corresponding to the display data, $p_{x-2k}$ to $p_{x+2k}$ are respectively grayscale values corresponding to the adjacent display data, and k is the scaling rate of the input frame relative to the original frame.

10. The ringing artifact removing method according to claim 9, wherein the ringing regulation value corresponding to each of the display data is determined by using following formula, $$R(x) = \max\left\{r(x) \middle| -\frac{k}{2} \leq x \leq \frac{k}{2}\right\}$$

wherein R(x) is the ringing regulation value corresponding to the display data.

11. The ringing artifact removing method according to claim 1, wherein the step of regulating the display data according to the regulating reference values respectively corresponding to the display data comprises:

low-pass filtering the grayscale values corresponding to the display data to output a display reference value corresponding to each of the display data; and regulating the grayscale value corresponding to each of the display data according to the regulating reference value and the display reference value corresponding to the display data to output grayscale values corresponding to the regulated display data.

12. The ringing artifact removing method according to claim 11, wherein the display reference value corresponding to each of the display data is determined by using following formula, $$f(x) = \frac{p_{x-k} + 2 \cdot p_x + p_{x+k}}{4}$$

wherein x is a factor corresponding to the display data, f(x) is the display reference value corresponding to the display data, $p_x$ is a grayscale value corresponding to the display data, $p_{x-k}$ to $p_{x+k}$ are respectively grayscale values corresponding to the adjacent display data, and k is a scaling rate of the input frame relative to the original frame.

13. The ringing artifact removing method according to claim 12, wherein grayscale values corresponding to the regulated display data are calculated by using following formula, $$p'_x = p_x(f(x) - p_x)|_{-S(x)}^{S(x)}$$

wherein $p'_x$ is the grayscale value corresponding to each of the regulated display data, and S(x) is the regulating reference value corresponding to each of the display data.

* * * * *